United States Patent
Kosaraju

(10) Patent No.: US 12,405,919 B2
(45) Date of Patent: Sep. 2, 2025

(54) SYSTEMS AND METHODS FOR USE IN EXTENDING DATA ORGANIZATION STRUCTURES

(71) Applicant: MASTERCARD INTERNATIONAL INCORPORATED, Purchase, NY (US)

(72) Inventor: Ravi Kosaraju, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/231,746

(22) Filed: Aug. 8, 2023

(65) Prior Publication Data

US 2025/0053542 A1    Feb. 13, 2025

(51) Int. Cl.
*G06F 16/14*    (2019.01)
*G06F 16/16*    (2019.01)

(52) U.S. Cl.
CPC .......... *G06F 16/152* (2019.01); *G06F 16/162* (2019.01)

(58) Field of Classification Search
CPC .............................. G06F 16/152; G06F 16/162
See application file for complete search history.

(56) References Cited

U.S. PATENT DOCUMENTS

| | | |
|---|---|---|
| 8,707,438 B1 | 4/2014 | Hsu |
| 9,424,554 B2 | 8/2016 | Hayton et al. |
| 10,423,682 B2 | 9/2019 | Cohen et al. |
| 11,132,338 B1 | 9/2021 | Zhang et al. |
| 2003/0204449 A1* | 10/2003 | Kotas ................... G06Q 10/087 707/781 |
| 2009/0216724 A1* | 8/2009 | Cai ........................ G06F 16/954 |
| 2011/0311095 A1* | 12/2011 | Archer .................. G06F 16/783 375/240.26 |
| 2012/0200568 A1* | 8/2012 | Gossweiler, III ....... G06F 30/00 345/420 |

(Continued)

OTHER PUBLICATIONS

Extensis Connect: Magage Fonts and all Other Creative Assets from Anywhere; web accessed Dec. 14, 2022; https://www.extensis.com/connect/platform; 6 pgs.

(Continued)

*Primary Examiner* — Cam Y T Truong
(74) *Attorney, Agent, or Firm* — Harness, Dickey & Pierce, P.L.C.

(57) ABSTRACT

Systems and methods are provided for extending data organization structures. One example computer-implemented method includes receiving a request for storage instructions from a computing device, where the request includes a first fingerprint specific to data content and one or more traits associated with a subscriber user associated with the computing device and identifying a first profile associated with the subscriber user, from a plurality of profiles, based on the one or more traits. The method also includes searching for the first fingerprint, in a plurality of data organization structure entries, which are specific to the first profile and, in response to a match for the first fingerprint, retrieving the data organization structure entry specific to the matching fingerprint. The method then includes transmitting at least a portion of the retrieved data organization structure entry to the first computing device associated with the subscriber user.

18 Claims, 3 Drawing Sheets

(56) References Cited

U.S. PATENT DOCUMENTS

| | | | |
|---|---|---|---|
| 2014/0207547 A1* | 7/2014 | Cheng | G06Q 40/02 |
| | | | 705/14.17 |
| 2016/0212118 A1* | 7/2016 | Barrall | H04L 63/08 |
| 2016/0219122 A1* | 7/2016 | Siliski | G06F 16/29 |
| 2020/0027063 A1* | 1/2020 | Snyder | G06F 16/248 |
| 2022/0286750 A1* | 9/2022 | Trollope | H04N 21/44008 |
| 2023/0306969 A1* | 9/2023 | Aher | G10L 17/18 |

OTHER PUBLICATIONS

US 11,423,682, Sep. 24, 2019, Cohen et al. (withdrawn).

\* cited by examiner

SYSTEMS AND METHODS FOR USE IN EXTENDING DATA ORGANIZATION STRUCTURES

FIELD

The present disclosure is generally directed to systems and methods for use in extending data organization structures, and in particular, to leveraging data organization structures associated with organized users to define data organization structures for other users.

BACKGROUND

This section provides background information related to the present disclosure which is not necessarily prior art.

Users are known to interact with various content providers to access data content. The data content may include entertainment content, such as, for example, movies, music, etc., or informational content, such as, for example, articles, manuals, datasheets, instructions, publications, etc. The user is known to access such data content from a computing device, such as, for example, a smartphone, a laptop, a tablet, etc. The user may have the option to access the data content, via a server associated with the content provider, whereby the content is retained by the data content provider (e.g., viewing a website, etc.), or alternatively, the user may have the option to download and store the data content. The manner in which the data content is accessed is often defined by the particular data content, the data content provider and/or terms of use of the data content, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Data content may be downloaded from a content provider, by a user, at a computing device and stored in memory thereof. The data content is often stored in a default location for all content (e.g., "Download" folder, etc.), and associated with the name of the data content, as named by the content provider. Often, the data content will be opened automatically when downloaded, whereby the user may view or otherwise use the data content immediately after the download. When the user is finished with the data content, the user closes the document, leaving the document stored in the default location. As the user downloads data content over time, the default location accumulates data content, which is generally stored in date order with no other organization, renaming, and/or tags associated therewith. As such, when the user desires to access earlier downloaded data content at a later time, the user finds it difficult to locate the data content and often either re-downloads the data content or requests it again from the content provider, given that the content provider is a known to be associated with and/or in control of the data content. In this manner, the lack of organized storage results in redundant and/or duplicative downloads, increased network traffic and overall inefficiencies in accessing data content.

Uniquely, the systems and methods herein provide for leveraging the data organization structures of organized users, for subscriber users, as a manner of storing data content.

In particular, organized users are generally users who take care in curating data content that they download (e.g., from the Internet, emails, etc.) to, for example, ensure it is named properly, saved in the proper location, etc., whereby the organized users define one or more data organization structures for the specific data content (e.g., layout, metadata, tagging, titling, etc.). An organization server captures data organization structure entries for the associated actions of the organized users and provides options for subscriber users to apply the data organization structure entries to data content downloaded thereby. In this manner, the specific data organization structures defined by the organized users are accessible to subscriber users, whereby efficiencies are gained in the storage and retrieval of data content. In this manner, duplicate downloading of data content is eliminated, or reduced, which results in a reduction of network traffic associated with the content providers.

Figure 1:
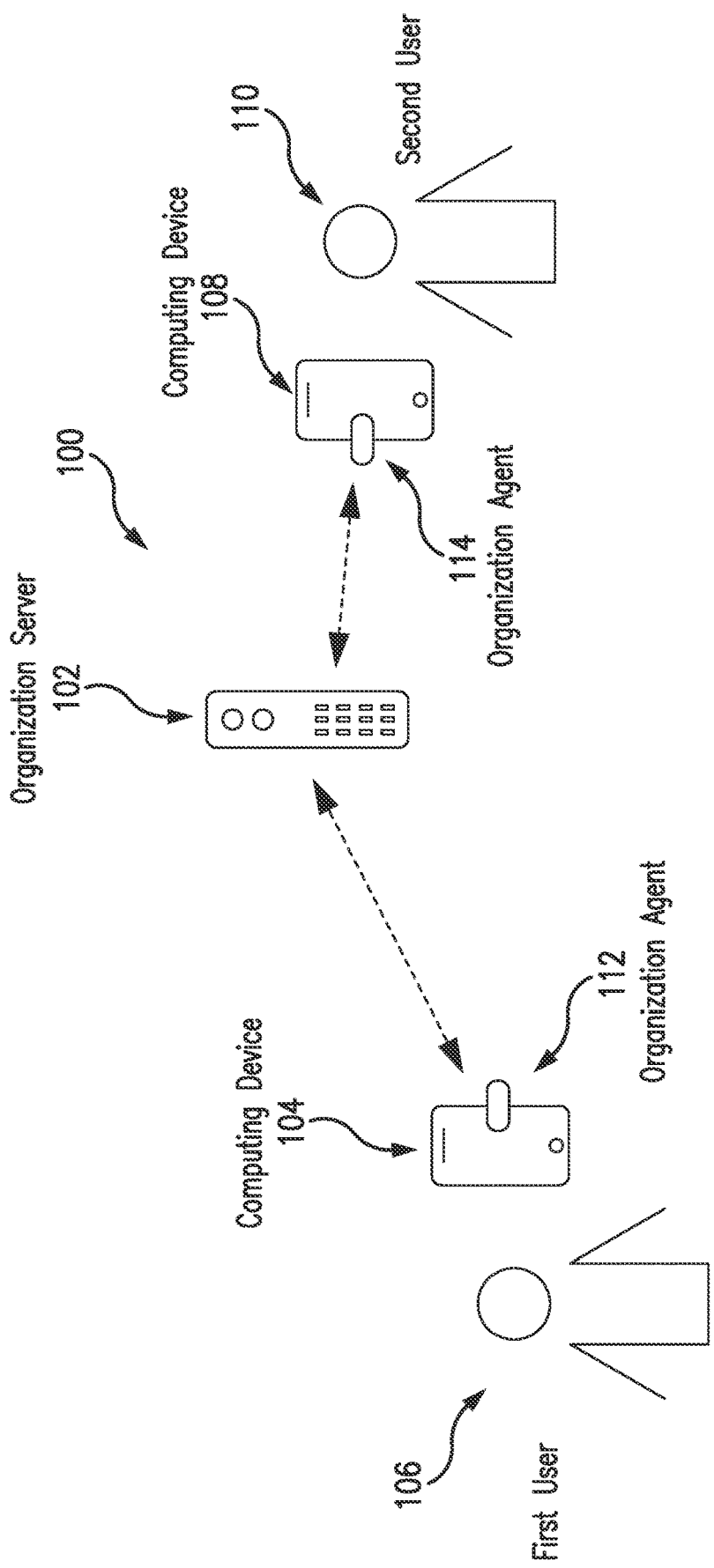
FIG. 1 illustrates an example system of the present disclosure suitable for use in extending data organization structures for specific data content.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, relationships between users, types of organization servers, privacy rules and/or requirements, data sharing rules and/or regulations, etc.

The system 100 generally includes an organization server 102, a computing device 104 associated with a first user 106, and a computing device 108 associated with a second user 110, each of which is coupled to one or more networks, which are indicated by the dotted lines, to provide communication therebetween. The network(s) may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

In this example embodiment, the organization server 102 is configured to coordinate data organization structures among the different users, whereby the data organization structures of certain users may be used to instruct the handling of data content for other users. The organization server 102 may be associated with a business, a social network, an educational institution, an agency, or other structured group of users. The organization server 102 may be associated with any suitable group of users, by which the users may be willing or permitted to share data, as described herein. The groups may be defined based on professional grouping (e.g., professional organizations, co-workers, etc.), social grouping (e.g., network of friends, etc.), membership, service, and/or other criteria, etc.

In connection with the organization server 102, each of the computing devices 104, 108 includes an organization agent 112, 114, respectively, as shown in FIG. 1. The organization agents 112, 114 include executable instructions, for example, in the form of an application, software-development kit (SDK), or otherwise, etc., which, in turn, configures the respective computing devices 104, 108 to cooperate and/or communicate with the organization server 102, as described in more detail below.

In particular, the first user 106 is defined, in this example, as an organized user. That is, the first user 106 is understood to curate data content which is downloaded to the computing device 108, for example, from the Internet (e.g., website, etc.), email, or otherwise, etc. The curation may include storing the data content in a particular location, naming the data content, adding metadata to the data content, and/or other suitable associated actions (e.g., moving, deletion, re-naming, etc.). The organized user is further willing, in this example, to allow sharing of the data organization structures defined through the curation of the data content with other users. In connection therewith, the first user 106 accesses the computing device 104, and specifically, the organization agent 112, and also registers with the organization agent 112. In doing so, the computing device 104, as configured by the organization agent 112, solicits one or more different traits from the first user 106 (e.g., age, gender, region, membership, employer, job title, etc.), and the first user 106 enters the solicited one or more traits. Additionally, or alternatively, the first user 106 (and other user) may be registered through a directory defined by an organization associated with the organization server 102 (e.g., employer, school, hospital, firm, association, agency, social network, etc.) (e.g., based on an organizational chart, etc.), whereby one or more traits are defined by the organization for the user 106.

The computing device 104, as configured by the organization agent 112, further captures data organization structure entries (for the first user 106, or organized user) based on the first user 106 interacting with data content, and transmits the same to the organization server 102. For example, where a technical manual is downloaded from www.Software123.XYZ/manuals, the first user 106 interacts with the computing device 108 to store the manual in a folder associated with manuals, and potentially, a subfolder associated with the specific software to which the manual is directed. The first user 106 further defines a name indicative of not only the data content but also the software, for example, Software123_manual, etc. In this way, a data organization structure in the computing device 108 is further defined to include the data content, in the folder named "Technical Manuals," in the subfolder named "Software123," with the name Software123_manual. The first user 106 may further apply additional metadata to the data content, as desired (e.g., indicator of file extension, file type, tags, compression, etc.). In addition, the computing device 108 is configured by the organization agent 112 to generate a fingerprint for the data content and to transmit a data organization structure entry for the data content to the organization server 102. The data organization structure entry includes the folder/subfolder/name and metadata for the data content (e.g., file type, extension, version, compression, tags, website of origin, etc.), traits about the first user 106 (e.g., age, gender, region, job title, etc.), and the fingerprint for the data content.

It should be understood that the data organization structure entry may be generated for other operations and/or actions of the first user 106 (e.g., moving the file to a different folder, renaming, compression and deletion, etc.). Table 1 includes examples of three data organization structure entries from the first user 106

TABLE 1

| Data Organization Structure Entries |
| --- |
| File Name: Toms_Grill_Menu |
| Folder: Menus |
| Subfolder: Toms_Grill |
| Fingerprint: 673495F7E7AC740987FBCD83451DEA1234 |
| Source: www.tomsgrill.XYZ/menu |
| File Name: Family_Beach_2023_Florida |
| Folder: Pictures |
| Subfolder: 2023 |
| Fingerprint: 0008ED567BAC740987FBCD83451DEA1234 |
| Source: email |
| File Type: JPEG |
| Tags: Mom, Dad, Charlie |
| File Name: Employee_Expense_Form |
| Folder: Company A Forms |
| Subfolder: None |
| Fingerprint: 973495F7E7AC740097DDCD83451DEA1234 |
| Source: www.CompnayA.XYZ/Intranet |
| Action: Store and delete same named data content (i.e., old expense form) |

It should be understood that the data content is not limited to manuals, menus, pictures and forms, and may include any data content, including, without limitation, video files, music files, documents, source code, executables, etc.

The organization server 102 is configured, in turn, to store the data organization structure entry. Specifically, the organization server 102 is configured to identify the first user 106 to a profile from a plurality of profiles. Each of the profiles of the organization server 102 includes a unique combination of traits, which are indicative of specific users. The traits may include, for example, without limitation, age, gender, height, residency (e.g., by region, state, city, rural versus urban, etc.), job title, employers, memberships, job type, profession (or professional area), department of a company, preferences (e.g., user-defined, historical, etc.), social network circles/friends, or other suitable traits associated with users, etc. In one or more examples, the profiles may include employees of a company, which are in the same department and/or related departments. In another example, the profiles may include different memberships of the users, or attendance at certain schools, institutions, events, etc. That said, in this example embodiment, the organization server 102 is configured to identify the first user 106 to the profile based on the traits of the first user 106, which were included with the data organization structure entry.

It should be appreciated that while only one organized user is illustrated in FIG. 1, there may be many users, hundreds, thousands, millions, etc., of users or more or less in other embodiments. As such, in these embodiments, the organization server 102 is configured to store data organization structure entries, in connection with the plurality of profiles, for the many users. Consequently, based on the above, the organization server 102 includes hundreds of thousands, million, or tens of million, or more (or less) data organization structure entries for data content accessed and/or curated by organized users.

With continued reference to FIG. 1, the second user 110 is not an organized user. As such, the second user 110 is understood to not curate data content which is downloaded to the computing device 108, but seeks to rely on organized users to instruct the storage of data content. In connection therewith, the second user 110 may access and download data content from one or more content providers. The computing device 108, in turn, is configured by the organization agent 114, to monitor downloads to the computing device 108, to generate a fingerprint for the data content (when a download is detected), and to submit the fingerprint, the data content and/or metadata associated therewith, along with one or more traits of the second user 110, to the organization server 102. As above, the second user 110 is registered to the organization agent 114, whereby one or more traits associated with the second user 110 are included in the computing device 108. In this example, the second user 110 is identified to the same profile as the first user 106 based on the one or more traits associated with the second user 110.

In this example embodiment, the second user 110 downloads the technical manual, Software123_manual, from www.Software123.XYZ/manuals as in the example above. In response, the computing device 108 is configured, by the organization agent 114, to generate the fingerprint for the technical manual and to submit a request for storage instructions to the organization server 102. The request includes one or more traits of the second user 110 and also the fingerprint, and also, potentially, the metadata associated with the data content (e.g., filename, source, extension, file type, etc.).

In turn, the organization server 102 is configured to identify a profile, from the plurality of profiles, for the second user 110 based on the one or more traits included in the request. When a profile is identified, the organization server 102 is configured to search for the fingerprint for data organization structure entries in the organization server 102. When a match is found, the organization server 102 is configured to retrieve the data organization structure entry for the matching data content and to transmit the data organization structure entry to the computing device 108. When no data organization structure entry is found based on the fingerprint, the organization server 102 may be configured to search for the metadata of the data content, including, the file name, source, extension, file type, etc. When a data organization structure entry is found in this manner, the organization server 102 is further configured to transmit the data organization structure entry to the computing device 108.

The computing device 108 is configured, by the organization agent 114, to display an interface to the second user 110 (i.e., the subscriber user) offering to store the data content in a specific location (e.g., in the folder named "Technical Manuals," in the subfolder named "Software123," etc.) and with a specific name (e.g., Software123_manual, etc.), as indicated in the data organization structure entry. In response to an acceptance from the second user 110, the computing device 108 is configured, by the organization agent 114, to store the data content consistent with the data organization structure entry. This may include storing the data content, and further, depending on the particular data organization structure entry in other examples, creating folders/subfolders, overwriting data content, compressing the data content, etc. The computing device 108 is configured, by the organization agent 114, to confirm storing the data content to the second user 110, and also to notify the organization server 102 of the acceptance of the data organization structure entry.

While the second user 110 is given the option to store the data content in the specific location in this example embodiment, alternatively, the computing device 108 may be configured, by the organization agent 114, to automatically store the data content consistent with the data organization structure entry without an input or acceptance from the second user 110.

In this example embodiment, based on notifications from computing devices of subscriber users, the organization server 102 may be configured to identify preferred organized users for subscriber users, in general, or specific to particular subscriber users, and then to prioritize the data organization structure entries of those particular organized users.

Figure 2:
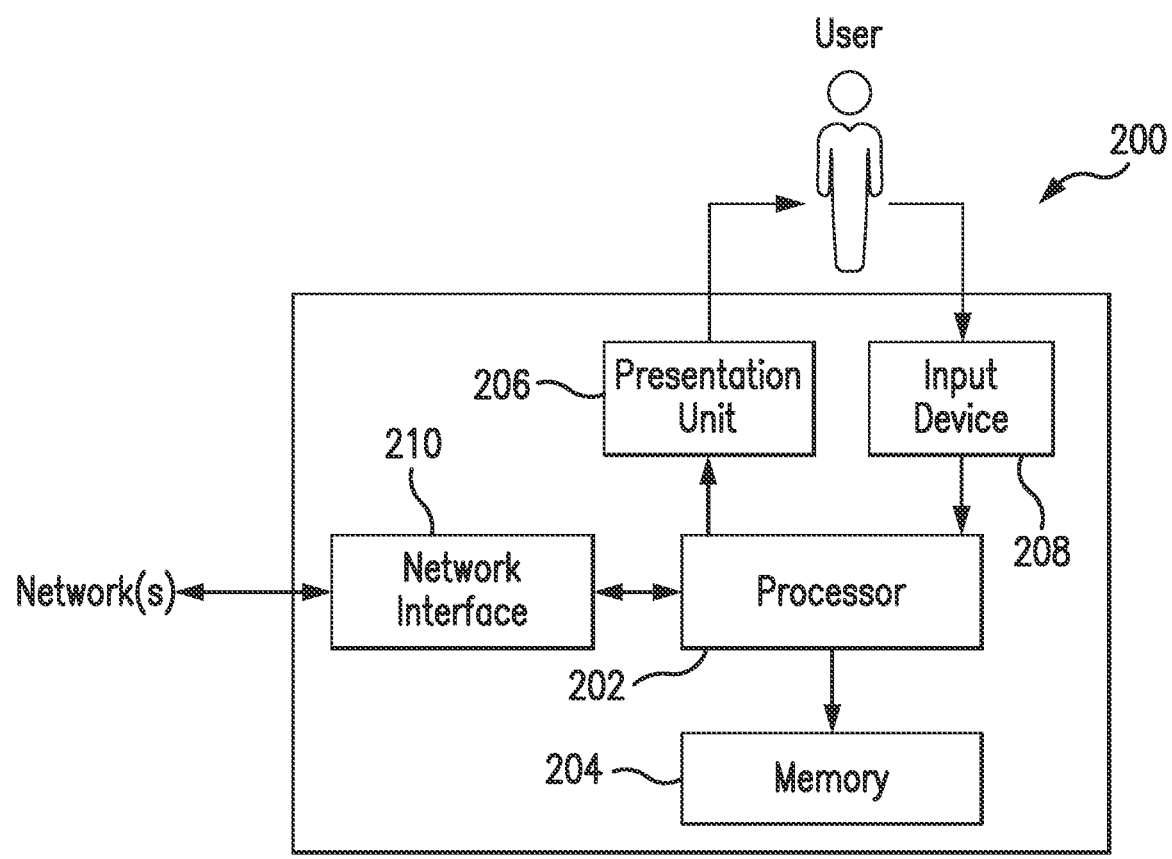
FIG. 2 is a block diagram of an example computing device that may be used in the system of FIG. 1.

FIG. 2 illustrates an example computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the organization server 102, the computing device 104, and the computing device 108 should be understood to include, or as being implemented or embodied in, one or more computing devices at least partially consistent with the computing device 200, coupled to (and in communication with) one or more of the networks. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, profiles and/or associated traits, data content fingerprints, data organization structure entries, and/or other types of data (and/or data structures and/or data organization structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations of method 300, etc.), whereby upon (or in connection with) performing such operation(s) the computing device 200 may be transformed into a special purpose computing device. It should be appreciated that the memory 204 may include a variety of different memories, each implemented in one or more of the functions or processes described herein.

In the example embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a sender or a recipient of funds in connection with consent, for example, etc. And various interfaces may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) of the computing device 200 such as described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and an input device 208.

Further, the illustrated computing device 200 also includes a network interface 210 coupled to (and is in communication with) the processor 202 and the memory 204. The network interface 210 may include, without limitation, a wired network adapter, a wireless network adapter (e.g., a WAN adapter, an NFC adapter, a Bluetooth™-adapter, etc.), a mobile network adapter, or other device capable of communicating to one or more different ones of the networks herein and/or with other devices described herein. In some example embodiments, the computing device 200 may include the processor 202 and one or more network interfaces incorporated into or with the processor 202.

Figure 3:
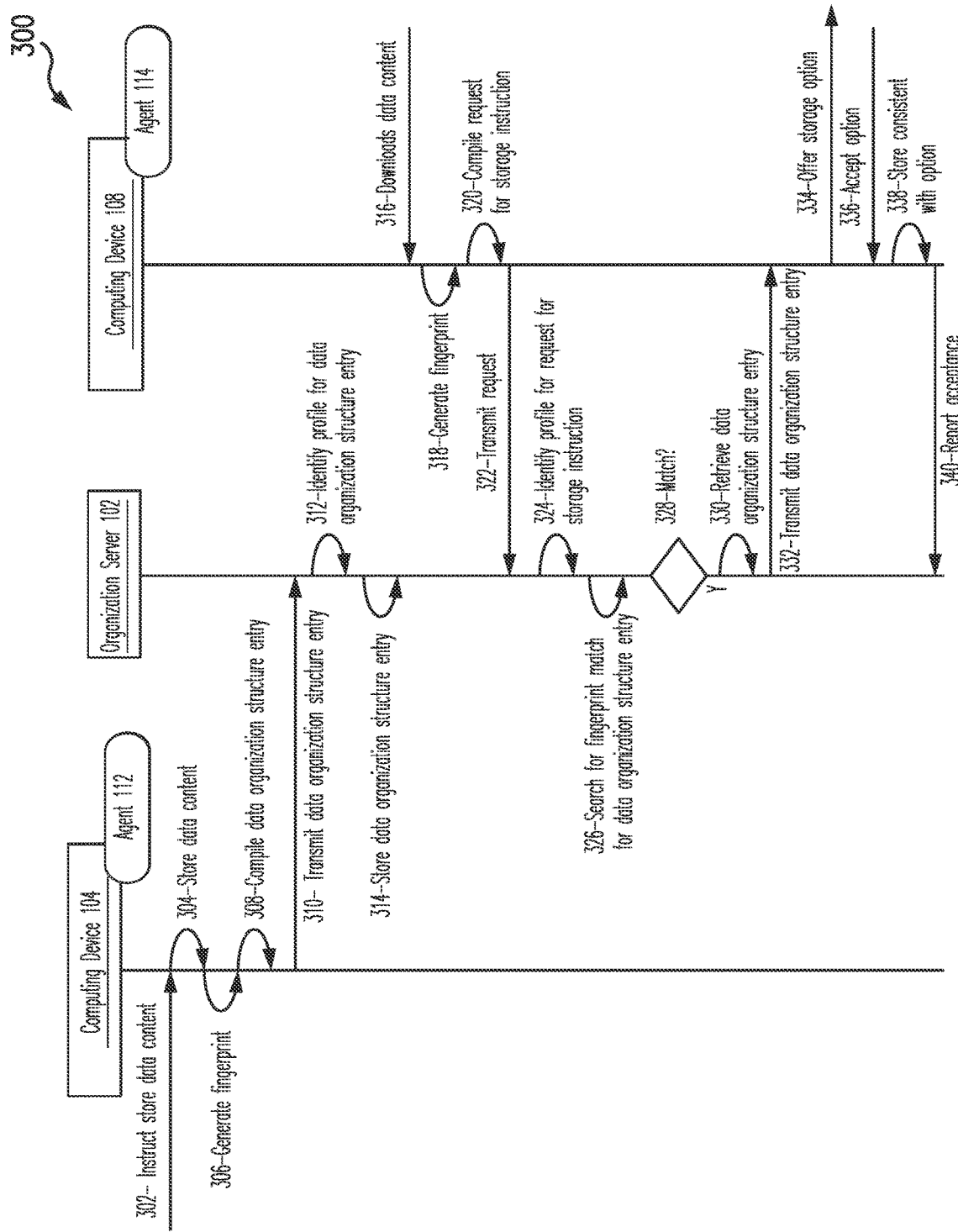
FIG. 3 illustrates an example method, which may be implemented in connection with the system of FIG. 1, for extending one or more data organization structures associated with an organized user for specific data content to other computing devices associated with a subscriber user.

FIG. 3 illustrates an example method 300 for use in extending data organization structures associated with specific users for specific content to other computing devices associated with other users. The example method 300 is described, generally with reference to the organization server 102 and other aspects of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the example method 300.

At the outset in the method 300, it should be appreciated that the first user 106 is an organized user, as explained above, and the second user 110 is a subscriber user, as explained above. Also, the name of the first user is Jane Smith. In this example, the users 106, 110 are employees of a Company A, and are both organized into the engineering department. It should be appreciated that the employment of the users 106, 110 and/or the organization of the users into the same department are provided for purposes of illustration. The users 106, 110 may have other relationships, or no relationship in other embodiments, and work for the same or different companies, or potentially, not be employed.

It should be further appreciated that each of the users 106, 110 is associated with a registration (e.g., with the organization server 102, etc.), via the respective organization agents 112, 114 in the computing devices 104, 108, respectively. As such, each is associated with certain traits specific to the users 106, 110. In this example, each user 106, 110 is associated with an employment trait, i.e., employed by Company A in the engineering department. It should be appreciated that other or different traits may be associated with the users 106, 110 in this example, and also other examples.

It should also be appreciated that the organization server 102 includes various profiles, each of which includes a unique combination of traits. In this example, the organization server 102 includes a profile, which is specific to employees of Company A in the engineering department, i.e., profile Eng_CompA.

That said, in the method 300, the first user 106 is browsing for data content via one or more networks, including, for example, the Internet, or reviewing emails from other users. In particular, the first user 106 navigates to a website, or reviews a specific email, and downloads a compressed data file either from the website or the email, for use within the scope of his/her employment. The compressed data file is named data_file.tgz, which is associated with certain metadata (e.g., version, etc.), and downloaded from www.domainname.XYZ/files associated with Company B.

At 302, the first user 106 instructs storage of the data content at folder1/subfolder5 with a name of March_data_file.tgz, in place of Jan_data_file.tgz (i.e., delete the older version). In response to the instruction, the computing device 104 stores, at 304, the content as instructed by the first user 106.

In connection therewith, the computing device 104, as configured by the organization agent 112, generates a fingerprint for the data content. The fingerprint may be generated as a hash of the data content, for example, via MD5, SHA-1, SHA-3, or other suitable hashing algorithms, etc. It should be appreciated that the fingerprint may be generated by other suitable techniques, which provide a specific format of output (e.g., 64 bits, 128 bit, 512 bit, etc.), whereby the fingerprint is substantially unique to the data file (e.g., based on the length of the output (e.g., $2^{64}$ for 64 bit, etc.) etc.). It should be appreciated that the uniqueness of the fingerprints may be defined specific to the implementation. Also, it should be appreciated that the fingerprints may be generated for the entire data content, or a defined part thereof.

That said, while various fingerprint generating techniques may be used in the method 300, the same techniques are used throughout the method 300 to ensure proper matching.

At 308, the computing device 104, as configured by the organization agent 112, compiles a data organization structure entry. The data organization structure entry includes the folder and subfolder at which the data content is stored, the fingerprint, action (e.g., save, replace, rename, move, delete, compress, etc.), one or more traits of the first user 106 (e.g., Jane Smith, Company A, engineering department, etc.), and potentially, the metadata, source of the data file (e.g., www.domainname.XYZ/files and Company B, etc.), etc.

The computing device 104, as configured by the organization agent 112, transmits, at 310, the data organization structure entry to the organization server 102.

In turn, the organization server 102 identifies, at 312, the profile associated with the first user 106, which, in this example, is the profile Eng_CompA. The organization server 102 then stores, at 314, the data organization structure entry in connection with the profile Eng_CompA.

The organization server 102, in general, repeats the above steps numerous times, whereby each of the profiles included therein is populated with data organization structure entries for various different data content.

At 316, the second user 110 downloads the file named data_file.tgz from www.domainname.XYZ/files associated with Company B. At 318, the computing device 108, as configured by the organization agent 114, generates a fingerprint for the data content (i.e., using the same technique as above in step 306).

Next, the computing device 108, as configured by the organization agent 114, compiles, at 320, a request for storage instructions, for the data content. The request includes the generated fingerprint and one or more traits of the second user 110 (e.g., Company A, engineering department, etc.). The request may optionally include the metadata for the data content and also the source information for the download. The computing device 108, as configured by the organization agent 114, transmits the request for storage instructions to the organization server 102, at 322.

In response, the organization server 102 identifies, at 324, a profile for the second user 110 and/or the request for storage instructions. In particular, in this example, the organization server 102 identifies the profile based on the one or more traits in the request, i.e., Company A, engineering department, whereby the profile Eng_CoompA is identified. It should be appreciated that the one or more traits may be associated with more than one unique profile, whereby the organization server 102 proceeds, as below, in each profile, and potentially, returns multiple data organization structure entries to the second user 110.

Once the profile Eng_CoompA is identified, the organization server 102 searches, at 326, in memory (e.g., memory 204, etc.) of the organization server 102 for the fingerprint included in the request from the second user 110 to determine if there is a match. When there is no match, the organization server 102 indicates the same to the computing device 108, and the method 300 ends.

Conversely, when the organization server 102 determines that there is a match, at 328, the organization server 102 retrieves the data organization structure entry associated with the matching fingerprint, at 330. At 332, the organization server 102 transmits the data organization structure entry to the computing device 108. Generally, the data organization structure entry includes instruction for storage and potentially, the name of the associated organized user (e.g., Jane smith, etc.), but may include additional information, such as, for example, the source, fingerprint, etc.

In response to the data organization structure entry, the computing device 108, as configured by the organization agent 114, offers, at 334, the storage option indicated by the data organization structure entry to the second user 110. The offer may include, for example, "Do you want to follow Jane Smith by renaming the file March_data_file.tgz and replace the older version of the data file in folder1/subfolder4?" or other similar language, whether in reference to Jane Smith or not. In turn, the second user 110 accepts the option, at 336, in this example, whereby the computing device 108, as configured by the organization agent 114, stores the data content consistent with the data organization structure entry, as the storage instructions, at 338. In this way, the data content is stored at the folder and subfolder location, as defined, and also the older version is deleted from the same subfolder. As such, the imposition of the data organization structure entry imitates the actions of the first user 106, i.e., the organized user associated with the same data content.

Further, in this embodiment, the computing device 108, as configured by the organization agent 114, reports the acceptance to the organization server 102, at 340. The organization server 102 may take subsequent action to either elevate or de-elevate data organization structure entries associate with certain organized users.

In view of the above, the systems and methods herein provide for extending data organization structures associated with specific users for specific content to other computing devices associated with other users. That is, certain un-organized users may have problems organizing data content (e.g., files, etc.) on their computing devices, whereby the users may spend more time than is necessary searching data content that was previously saved and/or end up downloading duplicate data content. By extending the data organization structures of users, which are organized and/or disciplined in data content on their computing devices, the systems and methods herein provide efficiencies in data organization structures being used in the computing devices of un-organized users. This provides for efficiency in data access and in searching for data content. Further, organized users are likely to exist within trust networks of user, as defined, for example, by a profile, where the data organization structures and associated organization skills are extended to the other users within the profile.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data organization structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving a request for storage instructions from a computing device, the request including a first fingerprint specific to data content and one or more traits associated with a subscriber user associated with the computing device; (b) identifying a first profile associated with the subscriber user from a plurality of profiles, based on the one or more traits; (c) searching, in a memory, a plurality of data organization structure entries, which are specific to the first profile, for the first fingerprint;

(d) in response to a match for the first fingerprint, retrieving the data organization structure entry specific to the matching fingerprint from the stored fingerprints; (e) transmitting at least a portion of the retrieved data organization structure entry to the first computing device associated with the subscriber user, whereby the subscriber user optionally stores the data content consistent with the retrieved data organization structure entry; (f) receiving the retrieved data organization structure entry from an organized user, the data organization structure entry associated with one or more traits of the organized user; (g) identifying the first profile, from the plurality of profiles, based on the one or more traits of the organized user; and/or (h) storing the retrieved data organization structure entry in the memory specific to the first profile.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a." "an." and "the" may be intended to include the plural forms as well, unless the context clearly indicates otherwise. The terms "comprises," "comprising." "including." and "having." are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" as well as the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in extending data organization structures, the method comprising:
   receiving a request for storage instructions for a document from a computing device, the request including a first fingerprint of the document and multiple traits of a subscriber user associated with the computing device;
   in response to the request for storage instructions for the document:
      identifying, by an organization server, a first profile, which is specific to an organizer user, for the subscriber user from a plurality of profiles, based on the multiple traits of the subscriber user being consistent with multiple traits of the organizer user included in the first profile, the organizer user being different than the subscriber user, the multiple traits of the subscriber user including one(s) of: age, gender, and/or membership;
      searching, by the organization server, in a memory, a plurality of data organization structure entries, which are specific to the first profile, for the first fingerprint, each data organization structure entry of the plurality of data organization structure entries identifying a folder and a subfolder into which to store said document, at the computing device of the subscriber user, with a defined name;
      in response to a match for the first fingerprint, retrieving, by the organization server, the data organization structure entry specific to a matching fingerprint in the memory; and
      transmitting at least a portion of the retrieved data organization structure entry to the computing device associated with the subscriber user, the at least a portion of the retrieved data organization structure entry identifying the folder, the subfolder and the defined name of the data organization structure entry specific to the matching fingerprint, whereby the subscriber user optionally stores the document consistent with the retrieved data organization structure entry in the folder and subfolder on the computing device with said defined name.

2. The computer-implemented method of claim 1, wherein the first fingerprint includes a hash of the document.

3. The computer-implemented method of claim 1, wherein the multiple traits of the subscriber user further include a department of employment of the subscriber user.

4. The computer-implemented method of claim 1, wherein the multiple traits of the subscriber user further include a preference of the subscriber user.

5. The computer-implemented method of claim 1, further comprising:
   receiving the retrieved data organization structure entry from an organized user, the data organization structure entry associated with the multiple traits of the organized user;

identifying the first profile, from the plurality of profiles, based on the multiple traits of the organized user; and
storing the retrieved data organization structure entry in the memory specific to the first profile.

6. The computer-implemented method of claim 5, wherein the data organization structure entry includes the matching fingerprint, as generated at a computing device associated with the organized user.

7. The computer-implemented method of claim 1, wherein the at least a portion of the data organization structure entry includes an action to delete a different data content.

8. A non-transitory computer-readable storage medium comprising executable instructions for use in extending data organization structures, which when executed by at least one processor of a computing device, cause the at least one processor to:
receive a request for storage instructions for a document from a computing device, the request including a first fingerprint of the document and multiple traits of a subscriber user of the computing device;
in response to the request for storage instructions for the document:
identify a first profile, which is specific to an organizer user, for the subscriber user from a plurality of profiles, based on the multiple traits of the subscriber user being consistent with multiple traits of the organizer user included in the first profile, the organizer user being different than the subscriber user, the multiple traits of the subscriber user including one(s) of: age, gender, and/or membership;
identify the first fingerprint, in a memory, to a matching fingerprint, which is associated with the first profile and at least one data organization structure entry, the at least one data organization structure entry identifying a folder and a subfolder into which to store said document, at the computing device of the subscriber user, with a defined name;
retrieve the at least one data organization structure entry; and
transmit at least a portion of the retrieved at least one data organization structure entry to the computing device, the at least a portion of the retrieved at least one data organization structure entry identifying the folder, the subfolder and the defined name of the at least one data organization structure entry, whereby the subscriber user optionally stores the document consistent with the retrieved at least one data organization structure entry in the folder and subfolder on the computing device with said defined name.

9. The non-transitory computer-readable storage medium of claim 8, wherein the first fingerprint includes a hash of the document.

10. The non-transitory computer-readable storage medium of claim 9, wherein the executable instructions, when executed by the at least one processor of the computing device, further cause the at least one processor to:
receive the retrieved at least one data organization structure entry from an organized user, the at least one data organization structure entry associated with the multiple traits of the organized user;
identify the first profile, from the plurality of profiles, based on the multiple traits of the organized user; and
store the retrieved at least one data organization structure entry in the memory specific to the first profile.

11. The non-transitory computer-readable storage medium of claim 10, wherein the at least one data organization structure entry includes the matching fingerprint, as generated at a computing device associated with the organized user.

12. The non-transitory computer-readable storage medium of claim 8, wherein the at least a portion of the at least one data organization structure entry includes an action to delete a different data content.

13. A system for use in extending data organization structures, the system comprising an organization server that comprises a processor configured to:
receive a request for storage instructions for a document from a computing device, the request including a first fingerprint of the document and multiple traits of a subscriber user of the computing device;
in response to the request for storage instructions for the document:
identify a first profile, which is specific to an organizer user, for the subscriber user from a plurality of profiles, based on the multiple traits of the subscriber user being consistent with multiple traits of the organizer user included in the first profile, the organizer user being different than the subscriber user, the multiple traits of the subscriber user including one(s) of: age, gender, and/or membership;
identify the first fingerprint, in a memory, to a matching fingerprint, which is associated with the first profile and at least one data organization structure entry, the at least one organization structure identifying a folder and a subfolder into which to store said document, at the computing device of the subscriber user, with a defined name;
retrieve the at least one data organization structure entry; and
transmit at least a portion of the retrieved at least one data organization structure entry to the computing device, the at least a portion of the retrieved at least one data organization structure entry identifying the folder, the subfolder and the defined name of the at least one data organization structure entry, whereby the subscriber user optionally stores the document consistent with the retrieved at least one data organization structure entry in the folder and subfolder on the computing device with said defined name.

14. The system of claim 13, wherein the first fingerprint includes a hash of the document.

15. The system of claim 13, wherein the organization server is further configured to: receive the retrieved at least one data organization structure entry from the organized user, the at least one data organization structure entry associated with the multiple traits of the organized user; identify the first profile, from the plurality of profiles, based on the multiple traits of the organized user; and store the retrieved at least one data organization structure entry in the memory specific to the first profile.

16. The system of claim 15, wherein the at least one data organization structure entry includes the matching fingerprint, as generated at a computing device associated with the organized user.

17. The system of claim 16, further comprising a non-transitory computer-readable storage medium comprising executable instructions, which when executed by the computing device associated with the organized user, cause the computing device associated with the organized user to generate the matching fingerprint.

18. The system of claim 16, wherein at least a portion of the at least one data organization structure entry includes an action to delete a different data content.

\* \* \* \* \*